United States Patent
Rodriguez Bravo

(10) Patent No.: US 11,094,219 B2
(45) Date of Patent: Aug. 17, 2021

(54) PORTABLE COMPUTING DEVICE HAVING A COLOR DETECTION MODE AND A GAME MODE FOR LEARNING COLORS

(71) Applicant: International Business Machines Corporation, Armonk, NY (US)

(72) Inventor: Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 16/202,235

(22) Filed: Nov. 28, 2018

(65) Prior Publication Data

US 2020/0168120 A1    May 28, 2020

(51) Int. Cl.
| | | |
|---|---|---|
| G09B 19/00 | (2006.01) | |
| G09B 5/06 | (2006.01) | |
| G09B 21/00 | (2006.01) | |
| G06F 40/205 | (2020.01) | |
| G10L 15/26 | (2006.01) | |
| G10L 13/08 | (2013.01) | |
| G06F 40/58 | (2020.01) | |
| G06F 40/47 | (2020.01) | |
| G06F 40/263 | (2020.01) | |
| G09B 7/02 | (2006.01) | |

(52) U.S. Cl.
CPC ....... *G09B 19/0023* (2013.01); *G06F 40/205* (2020.01); *G06F 40/263* (2020.01); *G06F 40/47* (2020.01); *G06F 40/58* (2020.01); *G09B 5/06* (2013.01); *G09B 7/02* (2013.01); *G09B 21/006* (2013.01); *G10L 13/086* (2013.01); *G10L 15/26* (2013.01)

(58) Field of Classification Search
None
See application file for complete search history.

(56) References Cited

U.S. PATENT DOCUMENTS

| | | |
|---|---|---|
| 6,142,784 A | 11/2000 | Wood |
| 6,882,824 B2 | 4/2005 | Wood |
| 7,029,283 B2 | 4/2006 | Marcus |
| 7,428,994 B1 | 9/2008 | Jeffway, Jr. et al. |
| 8,376,803 B2 | 2/2013 | Oonaka |
| 9,814,993 B2 | 11/2017 | Ponomarev et al. |
| 2002/0042713 A1 | 4/2002 | Kim et al. |

(Continued)

FOREIGN PATENT DOCUMENTS

| | | |
|---|---|---|
| CN | 202855129 | 4/2013 |
| CN | 105169722 | 12/2015 |

(Continued)

OTHER PUBLICATIONS

Tyche, True AI (Artificial Intelligence) Companion for Kids, Jan. 17, 2018, Retrieved from Internet: URL: https://www.kickstarter.com/projects/407592806/tyche-the-true-ai-companion-for-kids, 27 pages.

(Continued)

*Primary Examiner* — Nathan Hillery
(74) *Attorney, Agent, or Firm* — Schmmeiser, Olsen & Watts, LLP; William Hartwell

(57) ABSTRACT

A system and method for assisted-learning with a portable computing device that includes a color detection mode and a game mode.

20 Claims, 14 Drawing Sheets

(56) References Cited

U.S. PATENT DOCUMENTS

| | | | | |
|---|---|---|---|---|
| 2003/0059757 | A1* | 3/2003 | Wood | A63H 3/28 |
| | | | | 434/308 |
| 2004/0142308 | A1* | 7/2004 | Marcus | G09B 1/06 |
| | | | | 434/156 |
| 2004/0219496 | A1 | 11/2004 | Stevinson | |
| 2005/0215171 | A1* | 9/2005 | Oonaka | A61B 5/01 |
| | | | | 446/301 |
| 2015/0133025 | A1* | 5/2015 | Ponomarev | A63H 3/36 |
| | | | | 446/484 |
| 2016/0247495 | A1* | 8/2016 | Dourmashkin | G10H 1/34 |
| 2017/0036116 | A1 | 2/2017 | Cohen et al. | |
| 2017/0132019 | A1* | 5/2017 | Karashchuk | H04W 4/12 |
| 2017/0153175 | A1* | 6/2017 | Segal | G01J 3/46 |
| 2017/0263011 | A1* | 9/2017 | Yalniz | G06K 9/3233 |
| 2018/0136363 | A1* | 5/2018 | Yoon | G01V 8/12 |
| 2018/0137551 | A1* | 5/2018 | Zheng | G06K 9/00442 |
| 2019/0042894 | A1* | 2/2019 | Anderson | G06K 9/6257 |
| 2019/0129688 | A1* | 5/2019 | Yao | G10L 15/22 |
| 2019/0361595 | A1* | 11/2019 | Natesh | G06F 3/0482 |
| 2020/0134811 | A1* | 4/2020 | Chaturvedi | G06T 19/20 |

FOREIGN PATENT DOCUMENTS

| | | |
|---|---|---|
| CN | 205928670 | 2/2017 |
| WO | WO0169830 | 9/2001 |
| WO | WO2017164825 | 9/2017 |

OTHER PUBLICATIONS

Woobo: The Talking Robot Inspiring Curious Kids to Explore, Jan. 17, 2018, Retrieved from Internet: URL: https://www.kickstarter.com/projects/702843172/woobo-a-smart-companion-for-curious-kids, 41 pages.

Robot Toys for Toddlers, Retrieved from Internet: URL: https://www.buzzparent.com/toddlers/robot-toys-toddlers/, 10 pages (no date available).

Chandra, Vinesh, Teaching and Learning Mathematics With Robotics in Middle-Years of Schooling, Retrieved from Internet: URL: https://eprints.qut.edu.au/39730/, (2010), 2 pages.

Nao Robot Teach Simple Math, Retrieved from Internet: URL: https://www.youtube.com/watch?v=bPrtsFocMoo, RobotLAB Inc., Published on Jun. 28, 2017, 3 pages.

Nick Statt, The Leka Smart Toy is a Robot for Children With Developmental Disabilities, Retrieved from Internet: URL: https://www.theverge.com/ces/2017/1/4/14167590/leka-smart-toy-robot-autism-learning-tool-ces-2017, 5 pages.

McReynolds et al., Toys That Listen: A Study of Parents, Children, and Internet-Connected Toys, Retrieved from Internet: URL: https://dl.acm.org/citation.cfm?id=3025735, Proceeding CHI '17 Proceedings of the 2017 CHI Conference on Human Factors in Computing Systems pp. 5197-5207, Denver, Colorado, USA—May 6-11, 2017, ACM New York, NY, USA © 2017, table of contents ISBN: 978-1-4503-4655-9 doi>10.1145/3025453.3025735.

Amazon, Shop Movie and TV Toys, Amazon.com: CogniToys Dino, Powered by IBM Watson, Kids Cognitiv . . . https://www.amazon.com/CogniToys-Powered-Cognitive-Electronic-Lea . . . ; Jun. 21, 2018, 13 pages.

U.S. Appl. No. 16/202,291, filed Nov. 28, 2018.

U.S. Appl. No. 16/202,362, filed Nov. 28, 2018.

Mell, Peter et al.; "The NIST Definition of Cloud Computing;" National Institute of Standards and Technology; Special Publication 800-145; Sep. 2011; 7 pages.

Murphy, Jason A.; List of IBM Patents or Patent Applications Treated as Related; (corrected date from previous IDS filed today) May 28, 2021; 1 page.

\* cited by examiner

US 11,094,219 B2

PORTABLE COMPUTING DEVICE HAVING A COLOR DETECTION MODE AND A GAME MODE FOR LEARNING COLORS

TECHNICAL FIELD

The present invention relates to systems and methods for assisted learning, and more specifically the embodiments of an assisted learning system for detecting colors of objects and learning colors.

BACKGROUND

Many children begin learning colors at a young age. Often times, children learn colors from conventional sources, such as classes, textbooks, parents, television, and teachers. Moreover, some individuals have trouble seeing colors or have visual impairments that prevent the identification of colors in environments.

SUMMARY

An embodiment of the present invention relates to a method, and associated computer system and computer program product, for assisted learning with a portable computing device. In response to detecting that the portable computing device is in a color detection mode, a processor of a computing system converts an audio file received from a portable computing device into text. The text is parsed to determine that a user is requesting an identification of the color of the object in the environment shared by the user. A color sensor of the portable computing device is activated to emit one or more light sources of the color sensor towards the object, the color sensor recording a reflected property of the object, wherein the portable computing device uses the reflected property to obtain a code that is transmitted to the computing system by the portable computing device. The code is compared with an index of codes each associated with a plurality of colors to determine the color of the object. The portable computing device is instructed to audibly output a word associated with the determined color of the object in the environment in a default language. In response to detecting that the portable computing device is in a game mode, the processor of the computing system requests that the user identify a specific color, and detects that the user has placed an article within a field of view of the portable computing device. The color sensor of the portable computing device is activated to emit the one or more light sources of the color sensor towards the article to identify the color of the article. It is determined whether a color of the article matches the specific color, and at least one of a visual feedback and an audible feedback to the user is provided accordingly.

DETAILED DESCRIPTION

Figure 1:
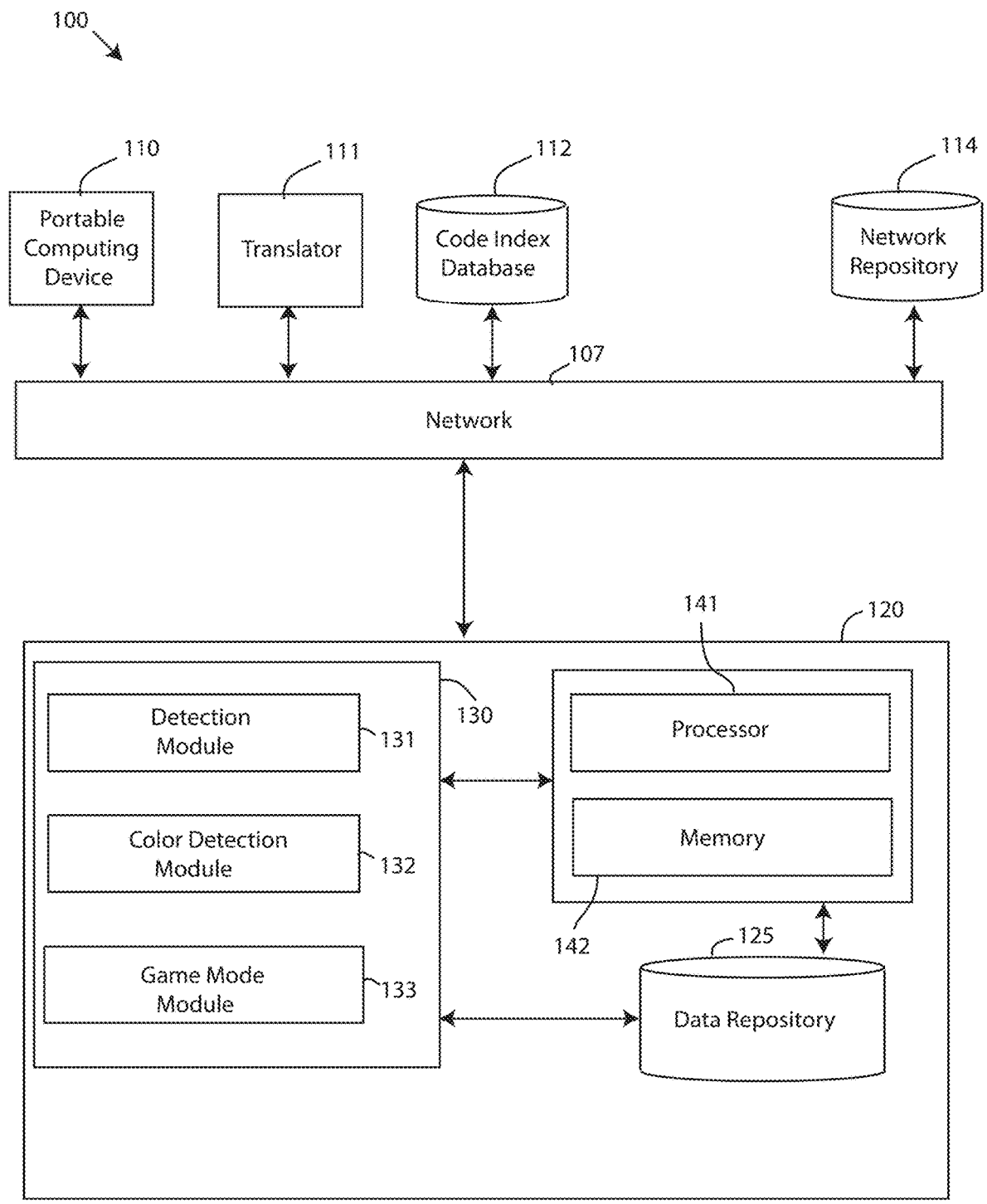
FIG. 1 depicts a block diagram of an assisted learning system, in accordance with embodiments of the present invention.

Referring to the drawings, FIG. 1 depicts a block diagram of an assisted learning system 100, in accordance with embodiments of the present invention. The assisted learning system 100 is a system for learning colors and/or detecting colors of objects in an environment. The assisted learning system 100 may be useful for users, such as children, who are beginning to learn colors, and for visually impaired individuals that cannot identify colors in an environment. Embodiments of the assisted learning system 100 may be alternatively referred to as a color learning system, a color detection system, a color identification system, a color learning game system, and the like.

The assisted learning system 100 includes a computing system 120. Embodiments of the computing system 120 include a computer system, a computer, a server, one or more servers, a backend computing system, and the like.

Furthermore, the assisted learning system 100 includes a portable computing device 110, a translator 111, and a code index database 112 that are communicatively coupled to the computing system 120 over a network 107. For instance, information/data is transmitted to and/or received from the portable computing device 110, the translator 111, and a code index database 112 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the users preferences, user game activity, user high scores, user location, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the users' preferences, user game activity, user high scores, user location, etc., and the like, to generate both historical and predictive reports regarding a particular user or a particular user learning progress. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The portable computing device 110 is a computing device that can be used by a user, such as a child, in a physical environment. In an exemplary embodiment, the portable computing device 110 is a robot that may support programmable movement. In other embodiments, the portable computing device 110 can be a cell phone, a mobile computing device, a smartphone, a tablet computer, a laptop computer, a wearable computing device, a smartwatch, an internet-connected doll or action figure, and the like. For instance, a portable computing device 110 may be operated by the user to learn colors or detect colors of objects in an environment shared by the user. The portable computing device 110 can include hardware functionality such as a speaker for emitting a sound, a vibration motor for creating vibrations, a display for displaying images, text, messages, videos, pictorial sequences, etc., a light emitting element for emitting a light, a receiver for receiving communications, a transmitter for transmitting signals, a microphone for capturing real-world audio, and other similar features and hardware of a computer, smartphone, smartwatch, cell phone, tablet computer, and the like.

Figure 2:
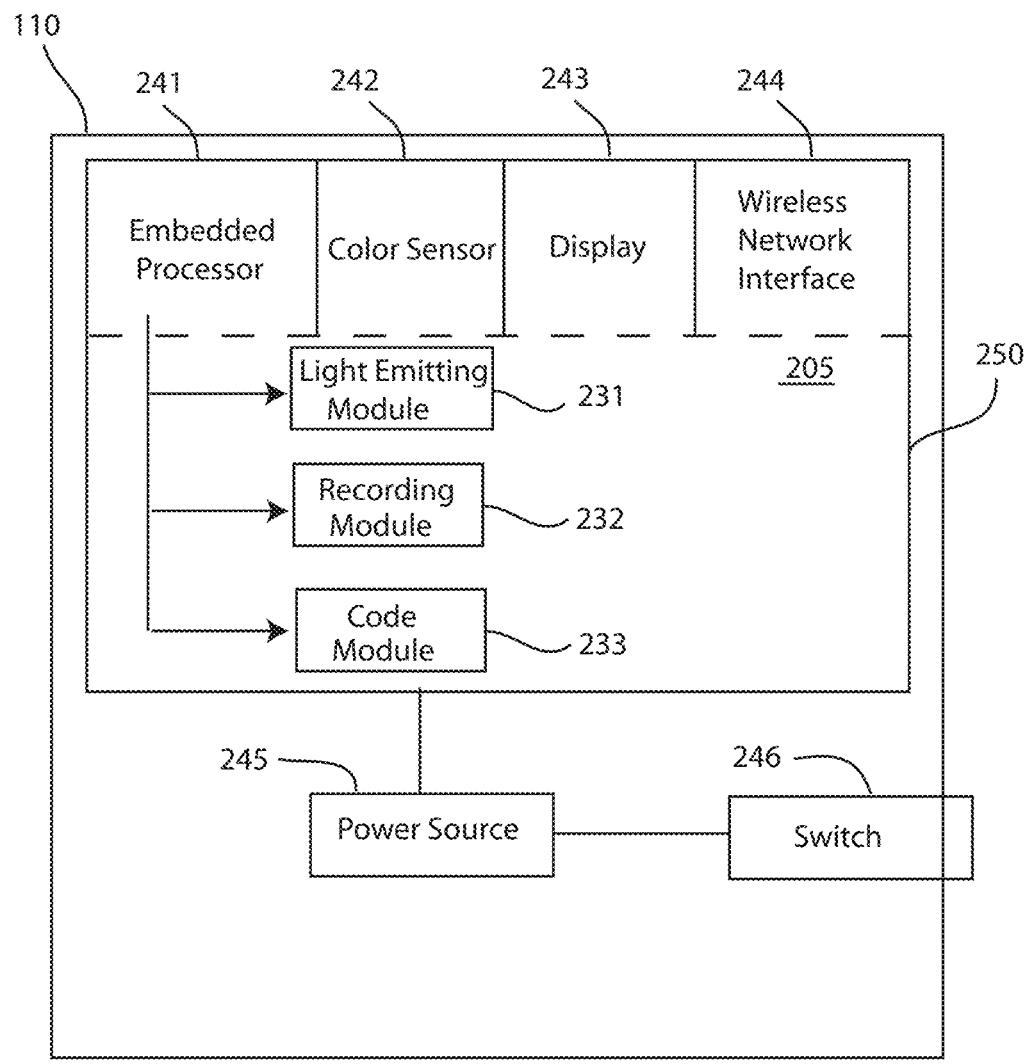
FIG. 2 depicts a block diagram of a portable computing device, in accordance with embodiments of the present invention.

FIG. 2 depicts a block diagram of a portable computing device 110, in accordance with embodiments of the present invention. The portable computing device 110 includes hardware and software components, and can be considered a microcomputer. The portable computing device 110 includes a specialized integrated circuit 250. The specialized integrated circuit may be specialized and dedicated to perform only the methods described herein. Embodiments of the specialized integrated circuit 250 may be an application specific integrated circuit (ASIC). In other exemplary embodiment, the integrated circuit 250 is a "Raspberry Pi" sensor component of a microcomputer Furthermore, embodiments of the specialized integrated circuit 250 may include an embedded processor 241, a color sensor 242, a display 243, and a wireless network interface 244. The circuit 250 is also coupled to a microphone and a speaker, not shown in FIG. 2. The portable computing device 110 further includes a power source 245, such as one or more batteries. Software components of the portable computing device 110 are located in a memory system 205 of the portable computing device 110, or a memory system coupled to the specialized integrated circuit 250. The specialized integrated circuit 250 includes the embedded processor 241 for implementing the tasks associated with the portable computing device 110. In an exemplary embodiment, the portable computing device 110 communicates with the computing system 120 to transmit information/data from collected audio and color data collected by the color sensor 242. For example, the specialized integrated circuit 250 utilizes the wireless network interface 244 for transmitting codes and digital audio data, over a network 107, to the computing system 120. Alternatively, the wireless network interface 244 may securely and exclusively connect to a user computing device (e.g. smartphone) associated with a user, over a short range communication network, and the user computing device can transmit additional environmental data (e.g. location data, images, etc.) to the computing system 120.

The portable computing device 110 is equipped with or coupled to a color sensor 242 to detect, photograph, scan, analyze, or otherwise capture physical properties of an object used to identify a color of the object within an environment. The color sensor 242 includes one or more light sources (e.g. LEDs) that emit light towards an object. The color sensor 242 records properties color of light or intensity/brightness of reflected lights) of the light reflecting off of the object as a result of the light being emitted at the object. For example, the color sensor 242 emits white light onto an object, and the light reflected passes through one or more filters (e.g. RGB filter) and a photodiode converts the reflected light into a voltage or current signal. The resultant signal is used to generate a code, such as a machine-readable code (e.g. sequence of random numbers or a hash code) stored in the memory 205 that is associated with a specific color.

Further, the portable computing device 110 is equipped with or coupled to a display 243. The display 243 includes a graphical user interface (GUI) that displays messages, text, results, instructions, questions, prompts, etc. received from the computing system 120 in response to the user operating the portable computing device 110 in a variety of ways described in greater detail infra. The GUI can be modified or otherwise augmented overtime to reflect a progress made by a user that is learning colors. Moreover, the portable computing device 110 includes a switch 246. The switch 246 may be partially located external to a housing of the portable computing device 110. The switch 246 can be a mechanical switch, or an electromechanical switch. For instance, the switch 246 is a button accessible to the user operating the portable computing device 110, wherein if the user depresses the switch 246, the power source 245 is activated (e.g. a circuit is completed by metal-to-metal contact, or other suitable means to employ a switch to turn on a power source may be used). Activating the power source 245 provides power to the specialized integrated circuit 250, and the color sensor 242 can be automatically activated as power is provided to the specialized integrated circuit 250 to begin a color identification procedure. By way of example, a user presses the switch 246, or a portion of the switch accessible to the user external to the housing, which powers up the specialized integrated circuit 250 to activate the color sensor 242 for capturing and/or gathering real-world signals needed to identify a color of an object.

Additionally, the portable computing device 110 includes software components, such as a light emitting module 231, a recording module 232, and a code module 233. A "module" refers to a hardware based module, software based module, or a module may be a combination of hardware and software. Hardware based modules include self-contained components such as chipsets, specialized circuitry and one or more memory devices, while a software-based module is part of a program code or linked to the program code containing specific programmed instructions, which may be loaded in the memory system 205 of the portable computing device 110 and/or in a memory coupled to the specialized integrated circuit 250. A module (whether hardware, software, or a combination thereof) may be designed to implement or execute one or more particular functions or routines.

The light emitting module 231 includes one or more components of hardware and/or software program code for emitting light from the one or more light sources of the color sensor. The light emitting module 231 can be activate and deactivated by the computing system 120 remotely to begin the color identification/detection process. Alternatively, the user can control the operation of the color sensor 242 by pressing switch 246 or another physical switch located on the portable computing device 110. The light emitting module 231 or other module of the portable computing device 110 can establish a connection or link between the portable computing device 110 and the user computing device, using the wireless network interface 244. The link between the portable computing device 110 and the user computing device may be established using Bluetooth® technology, near field communication (NFC), and/or a combination thereof.

The recording module 232 includes one or more components of hardware and/or software program code for recording the reflected light and converting the reflected light properties into a signal. For example, the recording module 232 records, processes, etc. the reflected light that passes through one or more filters and utilizes the photodiode to convert the reflected light into a voltage or current signal. The recording module 232 generates a code based on the resultant signal or locates the code stored in the memory 205 that is associated with a specific color.

The code module 233 includes one or more components of hardware and/or software program code for transmitting the code from the portable computing device 110 to the computing system 12.0 over network 107. For instance, the code module 233 calls an API and uploads the code to the computing system 120 for comparison with a code index database to determine the specific color of the object tested. Additional modules are included with the portable computing device 110, but are not shown in FIG. 2, such as a display module that includes one or more components of hardware and/or software program code for displaying messages, text, images, colors, instructions, etc. In some embodiments, the portable computing device 110 receives communications, messages, instructions, etc. directly from the computing system 120, and the display module displays the communications, messages, instructions, etc. on the display 243. In other embodiments, the communications, messages, instructions, etc. are received by a linked user computing device, and the user computing device directly displays the results, or sends the data to the portable computing device 110 over the short range communication network linking the user computing device and the display module displays the communications, messages, instructions, etc. on display 243.

Figure 3:
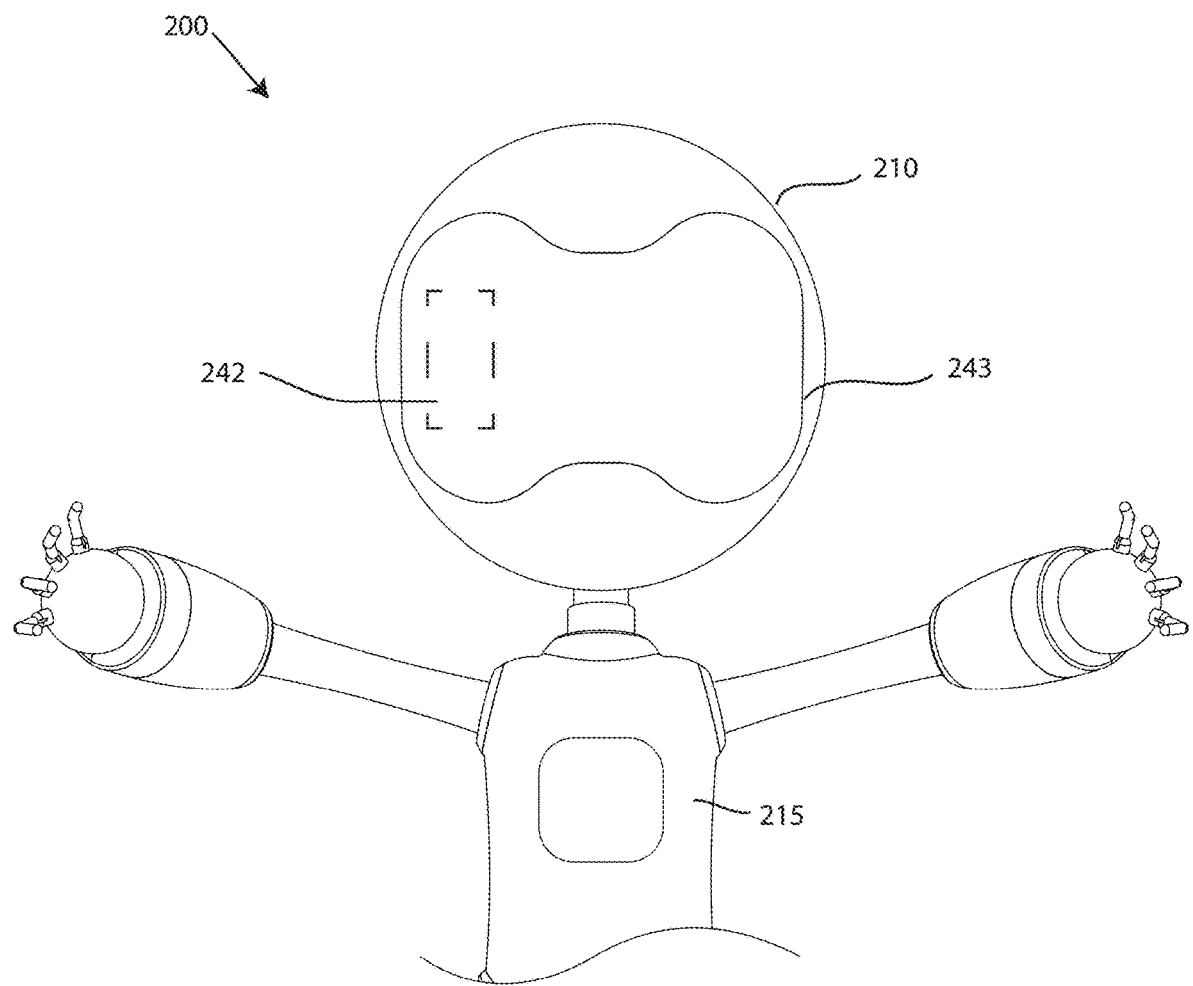
FIG. 3 depicts a perspective view of a portable computing device, in accordance with embodiments of the present invention.

FIG. 3 depicts a perspective view of a portable computing device 110, in accordance with embodiments of the present invention. In the illustrated embodiment, the portable computing device 110 is a robot 200 with having a head portion 210 and a body portion 215. The head portion 210 includes a display 243; the color sensor 242 is also located in the head portion 210. While one display 243 and one color sensor 242 are shown in the illustrated embodiment, the robot 200 can include more than one display 243 and more than one color sensor 242 positioned on the head portion 210 and/or the body portion 215 of the robot 200. The overall shape and size of the head portion 210 and the body portion 215 can vary to accommodate various needs, designs, applications, and the like. Furthermore, the robot 200 can include one or more sensors in addition to the color sensor 242, coupled to the integrated circuit 250. The one or more sensors can include a camera, a temperature sensor for detecting a temperature of the environment, a moisture sensor for detecting a moisture level of the environment, a GPS sensor for tracking a location of the robot 200, accelerometers, gyroscopes, and other sensors for obtaining physical characteristics of a movement of the robot 200. Further, the robot 200 may require ultra-low processing requirements to operate the color sensor 242 to keep computer processing requirements to a minimum, or to allow for those spared resources to be used elsewhere, such as for movement of the robot 200. For instance, the robot 200 can be programmed to move around within an environment to enhance the learning experience of the user. The robot 200 may be comprised of plastic, metal, or other materials can be used in combination with plastic or without plastic to form the robot 200.

Referring back to FIG. 1, the assisted learning system 100 includes a translator 111. The translator 111 is a software application, engine, or tool for providing machine translations for colors or other words between languages. The computing system 120 may utilize the translator 111 to translate the words for colors into several languages as requested by the user. In the illustrated embodiment, the translator 111 is a remote service accessed by the computing system 120 over network 107; however, a translation software application can be installed directly onto the computing system 120.

The assisted learning system 100 also includes a code index database 112. The code index database 112 is a database or other storage device that includes a plurality of codes (e.g. hash codes, random numerical sequence codes, and the like). The codes stored in the database are each associated with a specific color. For instance, the code generated or located by the portable computing device 110 and transmitted to the computing system 120 is compared to the plurality of codes stored in the code index database 112 to find a matching code. The color associated with the matching code stored in the code index database 112 is then determined to be the color of the object, as described in greater detail infra.

Furthermore, the computing system 120 of the assisted learning system 100 is equipped with a memory device 142 which stores various data/information/code, and a processor 141 for implementing the tasks associated with the assisted learning system 100. An assisted learning application 130 is loaded in the memory device 142 of the computing system 120. The assisted learning application 130 can be an interface, an application, a program, a module, or a combination of modules. In an exemplary embodiment, the assisted learning application 130 is a software application running on one or more back end servers (e.g. computing system 120), servicing the portable computing device 110 and potentially a linked personal user computing device.

Referring back to FIG. 1, the assisted learning application 130 of the computing system 120 includes a detection module 131, a color detection module 132, and a game module 133. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

Figure 4:
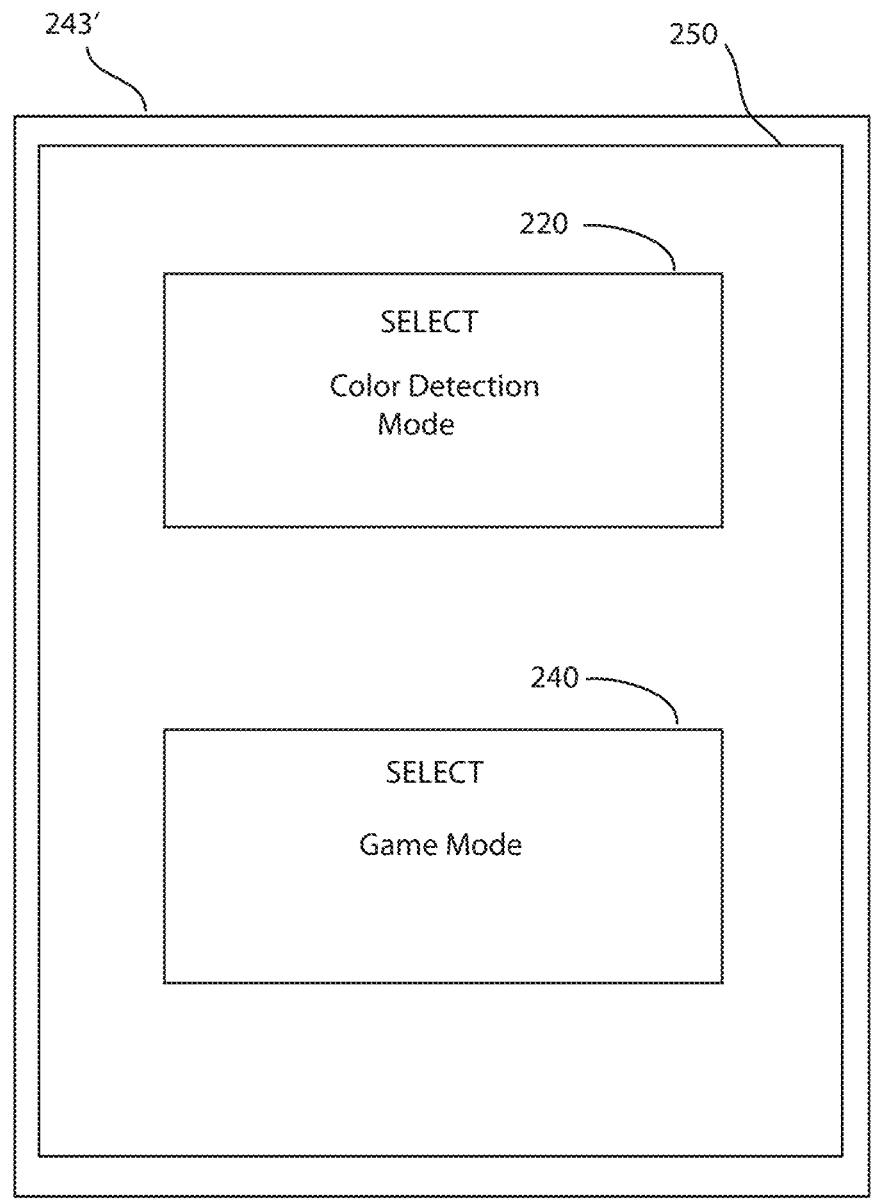
FIG. 4 depicts a graphical user interface of the portable computing device that permits a user to select between the color detection mode icon and the game mode icon, in accordance with embodiments of the present invention.

The detection module 131 includes one or more components of hardware and/or software program code for detecting whether the portable computing device 110 is in a color detection mode or a game mode. The portable computing device 110 supports at least two different modes of operation, the color detection mode and a game mode. FIG. 4 depicts a graphical user interface 250 of the portable computing device 110 that permits a user to select between the color detection mode icon 220 and the game mode icon 240, in accordance with embodiments of the present invention. If the portable computing device 110 is powered on, the user can select by interacting with a touchscreen display 243' of the portable computing device 110 to select one of the modes 220, 240. Alternatively, the user may select one of the modes 220, 240 using a voice command. The color detection mode allows a user to ask the portable computing device 110 to identify a color of an object within an environment. For instance, a user can direct the portable computing device 110, and in particular, the color sensor 24 towards an object and ask, "what is the color of this object?" The portable computing device 110 obtains a code associated with the data collected by the color sensor 242 and the computing system 120 determines the color. The portable computing device 110, after receiving the color information from the computing system 120, visibly and/or audibly outputs the color. By way of example, the user asks the portable computing device 110, "what is the color of the wall in front of me?", and the portable computing device 110 responds, "the color is blue" if the wall in the environment is blue. The color detection mode is useful for learning colors and reinforcing the colors learned by the user. Additionally, visually impaired or color-blind individuals can utilize the portable computing device 110 to determine colors of various objects within the environment.

The game mode allows a user to practice learning colors by answering questions from the portable computing device 110 regarding colors, while score is kept to track progress or to win a game. For example, the portable computing device 110 may ask a user to "find an object that is green." If the user finds and shows the portable computing device 110 an object that is green or predominantly green, the portable computing device 110 rewards the user with points and/or positive feedback. The game mode is useful for assisting the learning of colors in an interactive manner that leverages the technology of the portable computing device 110.

Moreover, the detection module 131 detects a state of various initialization, default setting, options menus, and startup procedures associated with the portable computing device 110. For instance, the detection module 131 detects whether the portable computing device 110 is powered on prior to performing any computational processes. The portable computing device 110 can be powered on by pressing a switch, such as switch 246, or can be powered on with a voice command, processed by the detection module 131. The detection module 131 also detects and/or sets from a user preferences the default language to be used during the interactions with the user. If the default language is English, then the colors are output in English, unless translations are requested. The detection module 131 may provide updates to the options menus that allow the user to vary the learning program.

Referring still to FIG. 1, the computing system 120 includes a color detection module 132. The color detection module 132 includes one or more components of hardware and/or software program code for implementing the color detection mode of the portable computing device 110. For instance, the color detection module 132 converts an audio file received from the portable computing device 110 into text. The audio file is sent to the computing system 120 by the portable computing device 110, in response to collecting the audio from a real-world environment. As the user speaks, one or more microphones of the portable computing device 110 collects the audio and creates a digital audio file (e.g. creates a .mp3 pack) for transmitting to the computing system 120 over the network. The digital file may be packetized and sent over the network in real-time to increase the speed in which the computing system 120 receives and parses the audio file over the network 107. The one or more microphones, when the portable computing device 110 is powered on, can continuously listen for and collect audio of the user so that the user can interact with the portable computing device 110 without needing to prompt the portable computing device 110 to listen for commands.

The color detection module 132 converts that audio file into text, and on response, parses the text to determine that a user is requesting an identification of the color of the object in the environment shared by the user. For example, the color detection module 132 uses speech-to-text software to convert the audio file into text. The language spoken by the user can also be detected by the color detection module 132 using the speech-to-text software as well a translation API associated with translator 111. The language spoken by the user can be automatically configured as the default language for outputting audible answers to the user's questions. In response to converting the received audio file to text, the color detection module 132 parses the text using natural language processing techniques or comparable techniques to understand what the user is saying. The parsing of the text can include detecting one or more keywords or triggers, such as "tell me what color this is", that can initiate a particular response by the computing system 120. The color detection module 131 can continuously parse the text as the audio file data is continuously received in real-time from the portable computing device 110. Based on the natural language analysis, the color detection module 131 can determine that a user is requesting n identification of the color of the object in the environment shared by the user (e.g. "what is the color of this curtain?).

In response to determining that the user is requesting identification of color, the color detection module 131 activates the color sensor 242 of the portable computing device 110. The remote activation of the color sensor 242 is done automatically after recognizing the voice command of the user ("tell me the color of my brother's shirt.) The color sensor 242 emits one or more light sources upon activation. The user can position the portable computing device 110 within the environment so that the color sensor 242 is facing the object to be identified. In an exemplary embodiment of the robot 200 shown in FIG. 3, the user can position the robot so that the display 243 of the head portion 210 of the robot 200 is facing the object, or so that the object is within the field of view of the object to be identified. In another embodiment sing robot 200, the user may remotely control the robot 200 in space so that the robot 200 is facing the object to be identified. The user can control the robot 200 using voice commands or a remote controller, depending on the capabilities of the robot 200. In other embodiments where the portable computing device 110 is a smartphone or other handheld or wearable computing device, the user can manually position the portable computing device 110 so that the object to be identified is within a field of view of the color sensor.

The color sensor 242 records a property of the object that is reflected off of the object to obtain a code that is transmitted to the computing system 120 by the portable computing device 110. As described above, the color sensor 242 records properties (e.g. color of light or intensity/brightness of reflected lights) of the light reflecting off of the object as a result of the light being emitted at the object. For example, the color sensor 242 emits white light onto an object, and the light reflected passes through one or more filters (e.g. RGB filter) and a photodiode converts the reflected light into a voltage or current signal. The resultant signal is used to generate a code, such as a machine-readable code (e.g. sequence of random numbers or a hash code) stored in the memory 205 that is associated with a specific color. The portable computing device 110 transmits the code to the computing system 120 for comparison with a code index database 112 to identify the correct color. In some cases, the color sensor 242 may fail to obtain/generate the code due to insufficient data received from the reflections from the targeted object. The color detection module 132 can detect that the code is not successfully obtained by the color sensor 242 of the portable computing device 111, and then provide feedback to a user to reposition the portable computing device 111 to improve color identification. In response to the repositioning of the portable computing device 110, the color detection module 132 can again activate the color sensor 242 to emit one or more light sources of the color sensor towards the object.

In response to the receiving the code from the portable computing device 110, the color detection module 132 compares the code with an index of codes each associated with a plurality of colors to determine the color of the object. For instance, the code index database 112 includes a table of codes that are each associated with a color, and the color detection module 132 accesses the code index database 112 and looks up the code received from the portable computing device 110 and locates a matching code. The matching code is associated with a color, which is the color of the object in the environment based on the data from the color sensor 242. The color detection module 132 extracts the text data from the table that indicates the color, in or more languages, and transmits the data back to the portable computing device 110. In other words, in response to determining the color of the object as a result of the comparison with the index of codes, the color detection module 132 instructs the portable computing device 110 to output a word associated with the determined color of the object in the environment in a default language. The color detection module 132 may activate, trigger, or otherwise cause a speaker and/or display of the portable computing device 110 to output the word of the color so that the user's question about what color is the object is answered. In an exemplary embodiment, the color detection module 132 instructs the portable computing device 110 to audibly output the word for the color of the object using one or more speaker units of the portable computing device 110. In this way, a user can hear the answer in a programmed voice emitted from the portable computing device 110. In another embodiment, the color detection module 132 instructs the portable computing device 110 to visually output the word for the color of the object using the display 243 of the portable computing device 110. In this way, a user can see the answer on the portable computing device 110. In yet another embodiment, the color detection module 132 instructs the portable computing device 110 to audibly output the word for the color of the object using one or more speaker units of the portable computing device 110 and visually output the word for the color on the display. In this way, a user can both hear the answer in a programmed voice emitted from the portable computing device 110 and read the answer from the display 243 of the device 110.

Additionally, the color detection module 132 implementing the color detection mode 132 can assist learning colors in a language different from the default language. For instance, the color detection module 132 can receive a request from the user that the word associated with the determined color be audibly output in a different language that is different than the default language. The color detection module 132 receives the request as an audio file, converts the speech into text, and parses the text, as described above, to understand the question of the user. The color detection module 132 utilizes the translator 111 to translate the word associated with the determined color into different language (e.g. as requested by the user or as the second language denoted in user settings) to determine a translated word associated with the determined color. The color detection module 132 then instructs the portable computing device 110 to audibly and/or visually output the translated word associated with the determined color of the object in the different language. As a result, the user can learn colors in more than one language.

Figure 5:
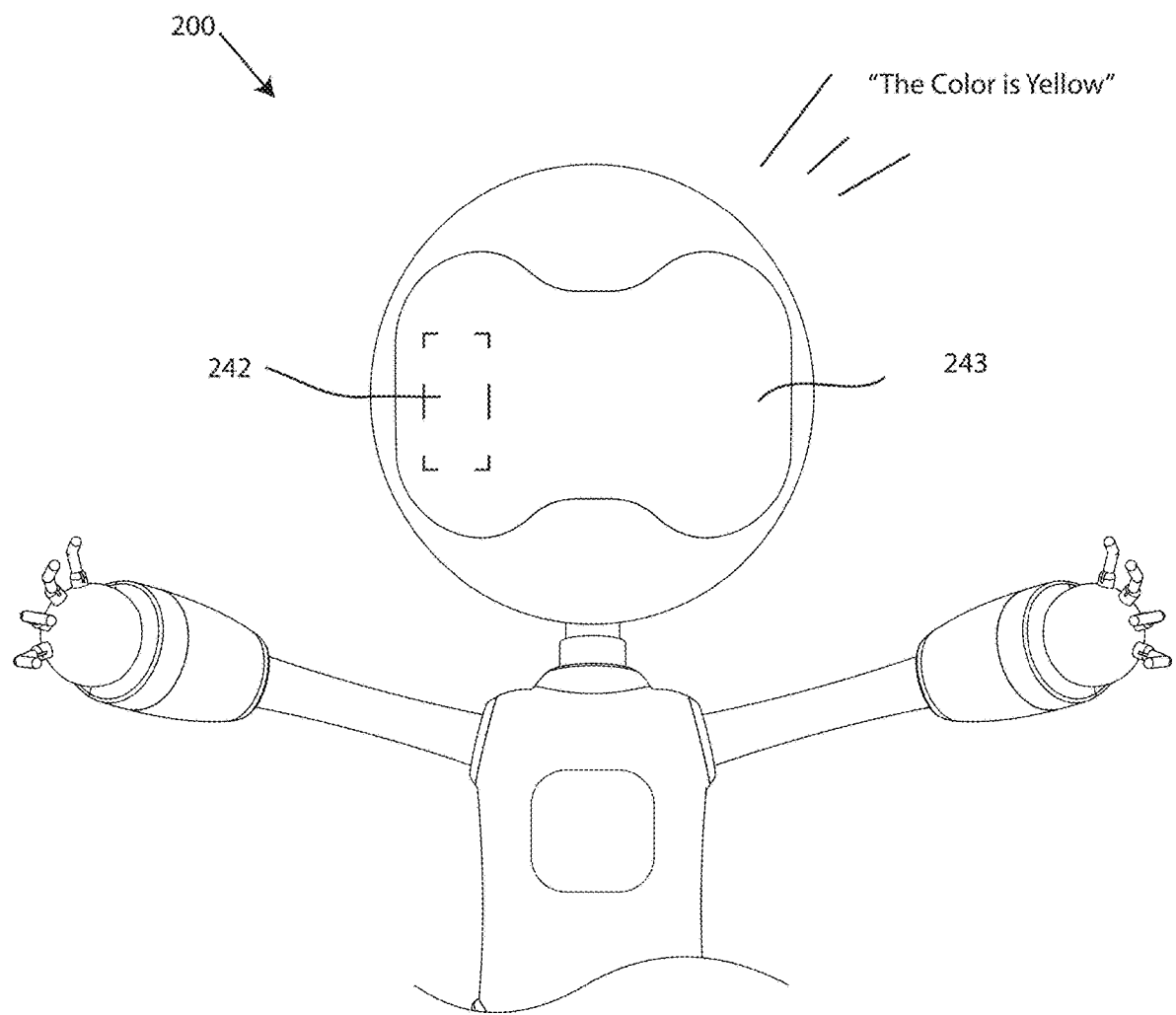
FIG. 5 depicts a schematic view of a robot responding to a user inquiry about color of an object, in accordance with embodiments of the present invention.

By way of example, the color detection mode of the portable computing device 110 can be used in a hands-free manner to detect a color of a yellow car parked in the driveway of the user. FIG. 5 depicts a schematic view of a robot responding to a user inquiry about a color of an object, in accordance with embodiments of the present invention. In this example, the user can be outside in the yard along with the robot device. The user can carry the robot over to the car parked in the driveway and ask "what color is that car?" in English. In real-time, the user's question is parsed and the color sensor is activated to detect the color of the object in the field of view of the robot. The robot audibly outputs the words "the color is yellow" in English so that the user now knows that the color of the car parked in the driveway is yellow. If the user is also learning a second language, the user can request that the word "yellow" is presented to the user in Spanish. In this case, the user states, "please translate that word into Spanish" and the robot audibly outputs the word "amarillo" in Spanish.

Referring back to FIG. 1, the computing system 120 include the game mode module 133. The game mode module 133 includes one or more components of hardware and/or software program code for implementing the game mode of the portable computing device 110. As described above, the user can select between the color detection mode icon 220 and the game mode icon 240. If the portable computing device 110 is powered on, the user can select the game mode icon 240 by interacting with a touchscreen display 243' of the portable computing device 110 to select one of the modes 220, 240. Alternatively, the user may select the game mode icon 240 using a voice command. In response to determining that the portable computing device 110 is in game mode, the game mode module 133 initializes a game sequence (e.g. sets an initial score, pulls profile information of the user, etc.) and then requests that the user identify a specific color. The request can be a voice request emitted from the portable computing device 110 and generated by the computing system 120. The request can be a voice command, such as "show me something yellow," along with a message, "show me something YELLOW" displayed on the display 243 of the portable computing device 110. The user searches the user's environment for an object or article that matches the color requested (e.g. yellow). Once the user believes that the user has located an object or article that is yellow, the user can either position or command the robot 200 to face the object, or position the object or article in the front of the color sensor 242 of the portable computing device 110. The game mode module 133 detects that the user has placed the article within a field of view of the portable computing device 110. In an exemplary embodiment, the detection occurs if an object is placed within a predetermined threshold distance from the color sensor 242. The game mode module 133 activates the color sensor 242 of the portable computing device 110 to emit the one or more light sources of the color sensor towards the article to identify the color of the article. Optionally, the game mode module 133 only activates the color sensor 242 if an object s detected within the predetermined threshold distance from the color sensor 242.

Using the techniques described above with respect to the color detection module 132, the game mode module 133 determines whether a color of the article matches the specific color. For instance, the color sensor 242 is used to obtain properties of the object in response to the light being emitted towards the object, and then a code is generated and then compared to an index of codes by the computing system 120 to identify the color. The game mode module 133 compares the actual color of the object with the color included in the initial request to find an object of a particular color, and determines whether the user is correct. The game mode module 133 provides at least one of a visual feedback and an audible feedback to the user. Providing positive visual feedback in the game mode includes displaying a congratulatory message on the portable computing device 110, and providing positive audible feedback includes initiating, a musical sequence associated with a correct answer. Feedback is also provided if the user is incorrect. For example, the game mode module 133 provides the correct color to the user so that the user can learn the correct colors even if the user is incorrect. If the user is correct, the game mode module 133 can increase a score of the user in the game mode. If the user is incorrect, the game mode module 133 can decrease a score of the user in the game mode.

The computing system 120 can thus modify a graphical user interface of the portable computing device 110 to display words, colors, user progress, user scores, and the like. The portable computing device 110 can be used on a daily basis to learn colors in an interactive manner. As a result, a GUI augmentation module of the computing system 120 augments the graphical user interface of the portable computing device 110 to update the user's score and learning progress in response to receiving additional results from the game mode and/or color detection mode. The learning progress reports can be tracked and monitored over time to formulate suggested changes to a user's learning program, difficulty, etc.

In alternative embodiments, the game mode module 133 may request that the user touch an area of the display of the portable computing device 110 that is a particular color. For example, in embodiments where the portable computing device includes a touchscreen display, the game module 133 displays an image that may include more than colored object. The user can be asked to touch an area of the display that is a particular color. The game mode module 133 determines if the area of the screen touched by the user corresponds to the correct color. If correct, the game mode module 133 provided positive feedback, and if not, the game mode module 133 provides feedback on the error made by the user.

Figure 6:
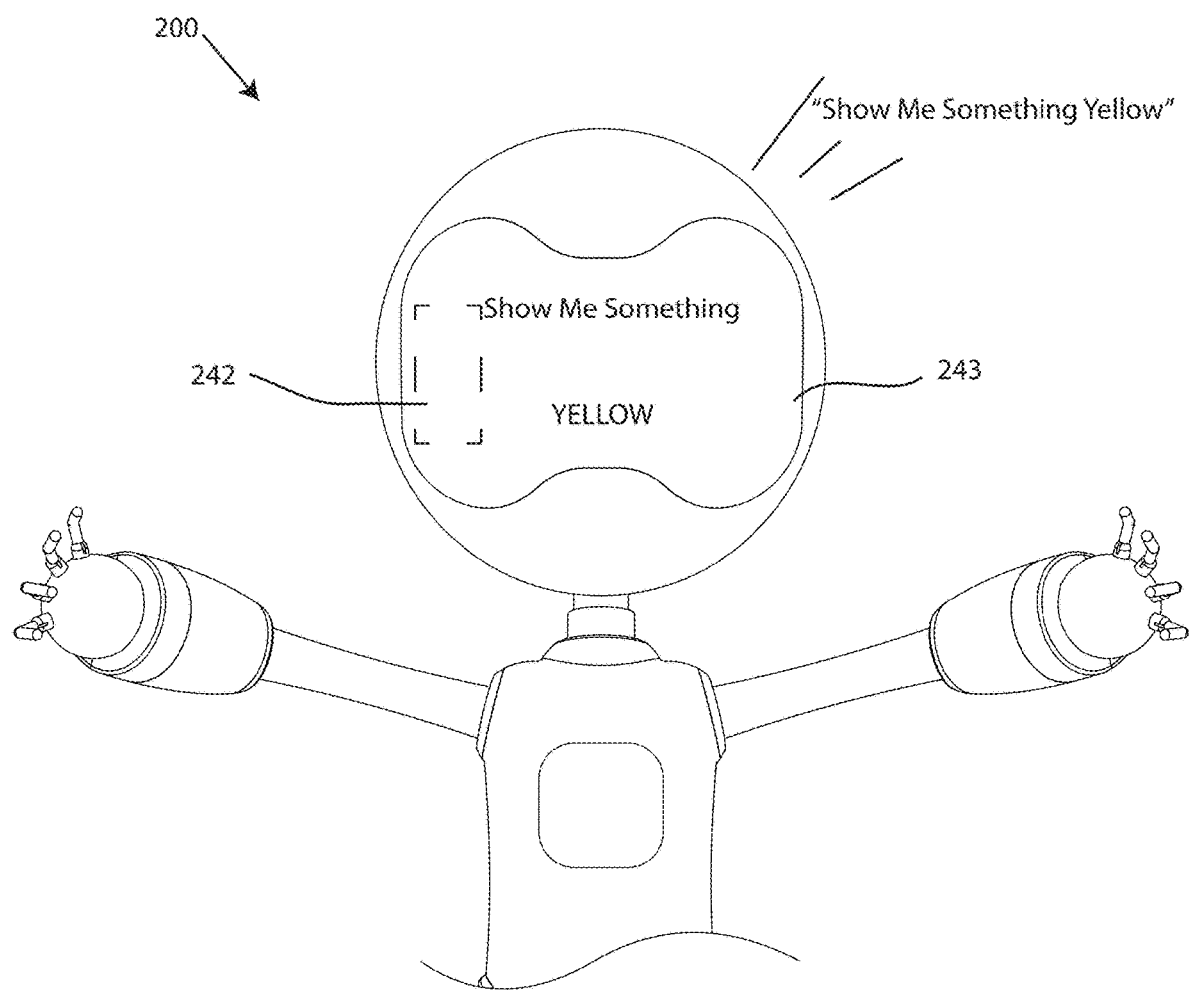
FIG. 6 depicts a schematic view of a robot requesting that a user find an object of a specific color, in accordance with embodiments of the present invention.
Figure 7:
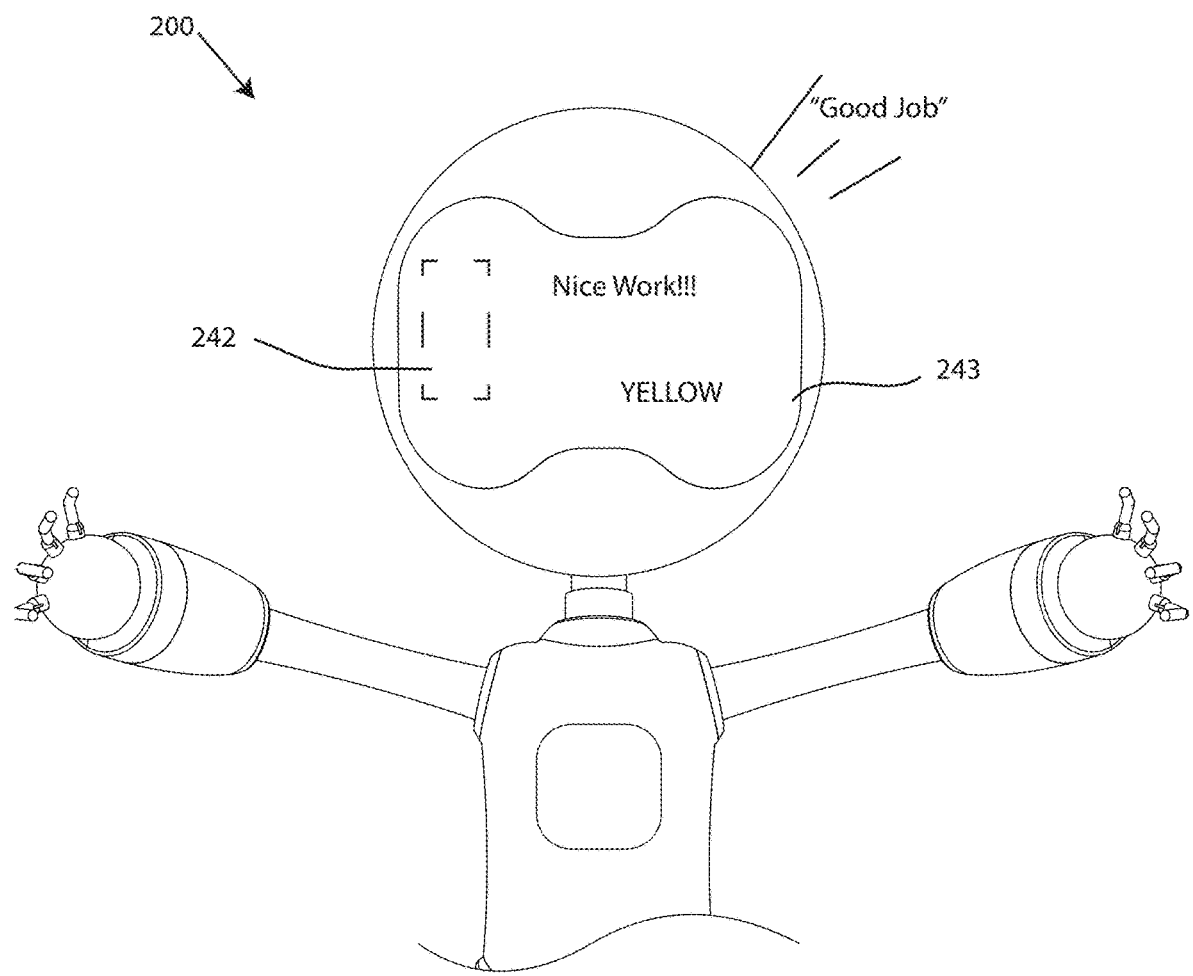
FIG. 7 depicts a schematic view of a robot confirming that the user has correctly identified an object matching the requested color, in accordance with embodiments of the present invention.
Figure 8:
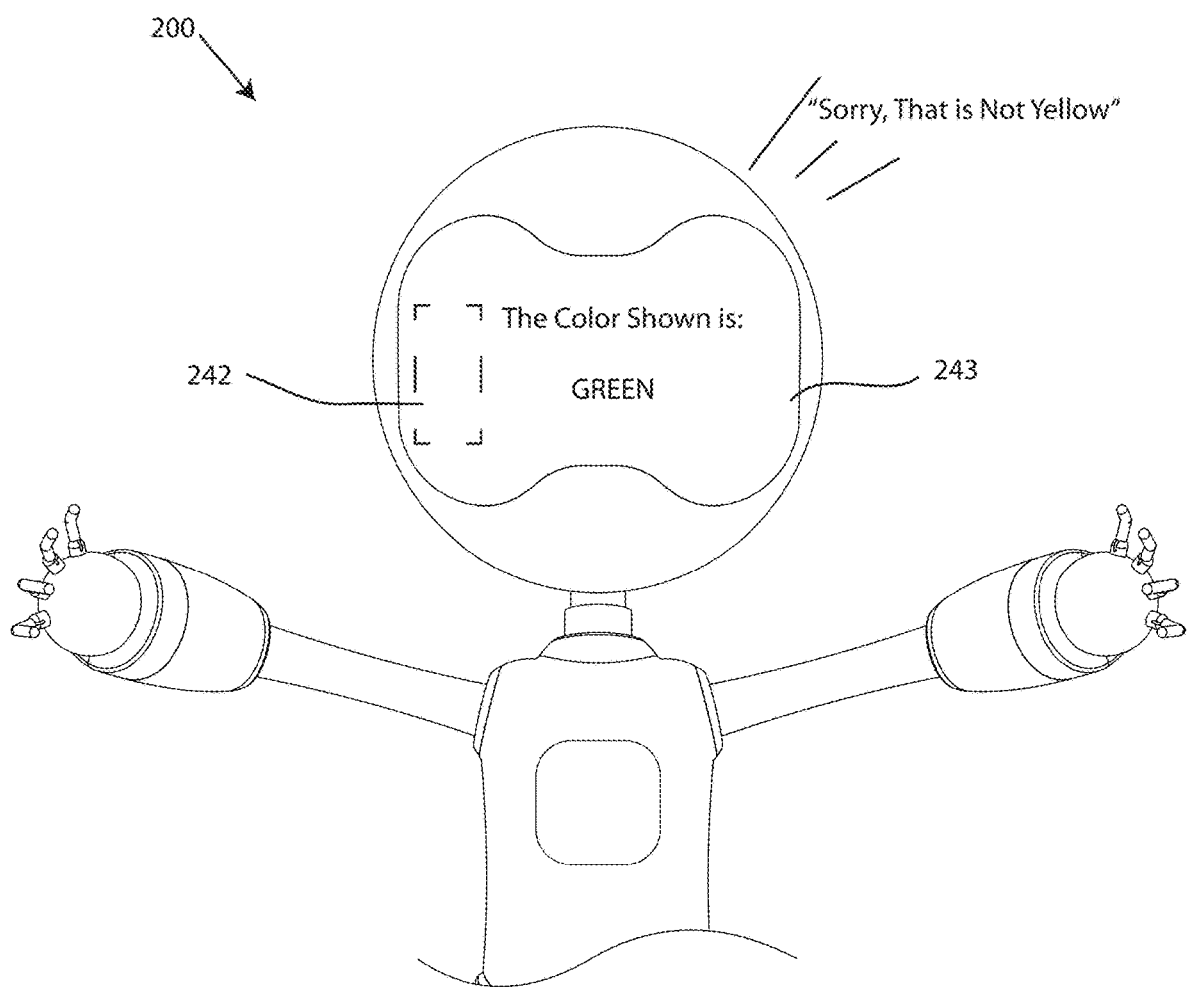
FIG. 8 depicts a schematic view of a robot confirming that the user has incorrectly identified an object matching the requested color, in accordance with embodiments of the present invention.

By way of example, the game mode of the portable computing device 110 can be used to learn colors over time by playing a game and challenging the user to find objects having a particular color. FIG. 6 depicts a schematic view of a robot requesting that a user find an object of a specific color, in accordance with embodiments of the present invention. In the illustrated embodiment, the robot 200 asks the user to "show me something yellow" while simultaneously displaying the message "show me something YELLOW." In response, the user searches the user's environment and finds a ripe banana, and places the banana in front the of the color sensor 242 of the robot 200. The robot 200 obtains the color of the object (i.e. banana) and confirms that the user is correct. FIG. 7 depicts a schematic view of a robot confirming that the user has correctly identified an object matching the requested color, in accordance with embodiments of the present invention. As shown in FIG. 7, the robot 200 audibly outputs "Good Job" while simultaneously displaying a message "Nice Work" . . . YELLOW" on the display 243. The interactive feedback alerts the user to a successful response to the request. The user's score increases. However, if the user placed an apple in front of the color sensor 242 of the robot 200 instead of the banana, the robot 200 would provide feedback to the user that the user was incorrect. FIG. 8 depicts a schematic view of a robot confirming the user has incorrectly identified an object matching the requested color, in accordance with embodiments of the present invention. As shown in FIG. 8, the robot 200 audibly outputs "Sorry, that is not yellow" while simultaneously displaying a message "The color shown is: GREEN" on the display 243. The interactive feedback alerts the user to an successful response to the request, and provides the user with the correct response so that the user continues to learn. The user's score decreases.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the assisted learning system 100 uses specific hardware, such as color sensors, for identifying colors of objects within a real-world environment, using real-world signals, such as reflected light. The GUI of the specialized device (e.g. robot 200) is modified or otherwise augmented to present custom results to the user. The assisted learning system 100 provides a technical solution by augmenting GUIs of specialized devices based on a set outcomes determined by the operation of specific hardware to determine color of objects in environments.

Figure 9:
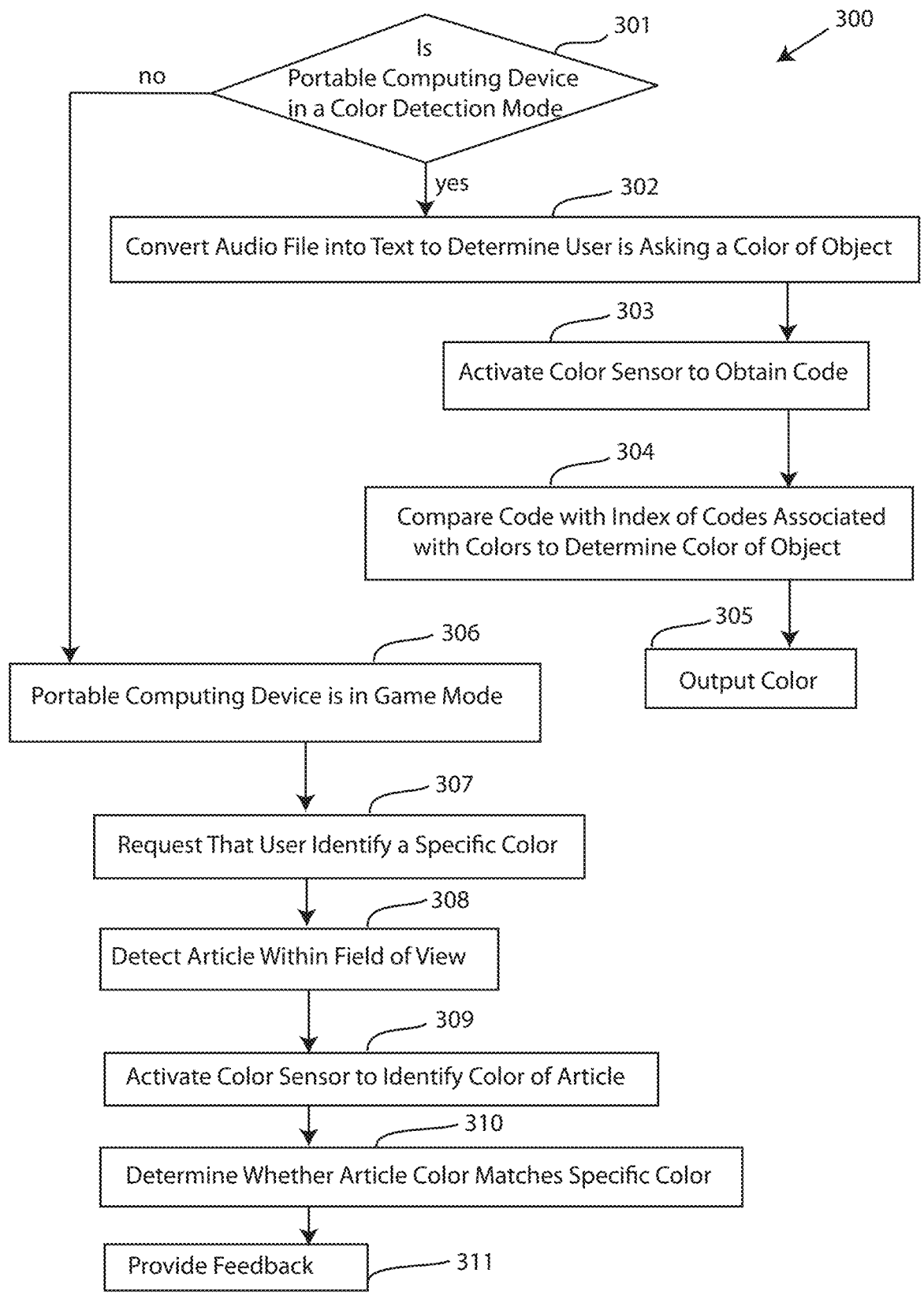
FIG. 9 depicts a flow chart of a method for assisted-learning with a portable computing device, in accordance with embodiments of the present invention.

Referring now to FIG. 9, which depicts a flow chart of a method 300 for assisted-learning with a portable computing device, in accordance with embodiments of the present invention. One embodiment of a method 300 or algorithm that may be implemented for assisted-learning with a portable computing device with the assisted learning system 100 described in FIGS. 1-8 using one or more computer systems as defined generically in FIG. 12 below, and more specifically by the specific embodiments of FIG. 1.

Embodiments of the method 300 for assisted-learning with a portable computing device, in accordance with embodiments of the present invention, may begin at step 301 wherein step 301 determines whether the portable computing device is in a color detection mode. If yes, step 302 converts the audio file into text to determine that the user is asking a question about the color of an object within the user's environment. Step 303 activates the color sensor of the portable computing device to obtain a code. Step 304 compares the code with an index of codes each associated with a color to determine the color of the object. Step 305 outputs the word correlating to the color of the object, either audibly, visually, or both. If the answer to step 301 is no, then step 306 determines that the portable device is in a game mode. Step 307 requests that the user identify a specific color, for example, by finding an article that is the same color as the requested color. Step 308 detects that the article is within a field of view of the color sensor. Step 309 activates the color sensor to identify the color of the article within the field of view. Step 310 determines whether the article color matches the specific color in the initial request. Step 311 provides feedback according to whether the user was correct or incorrect.

Figure 10:
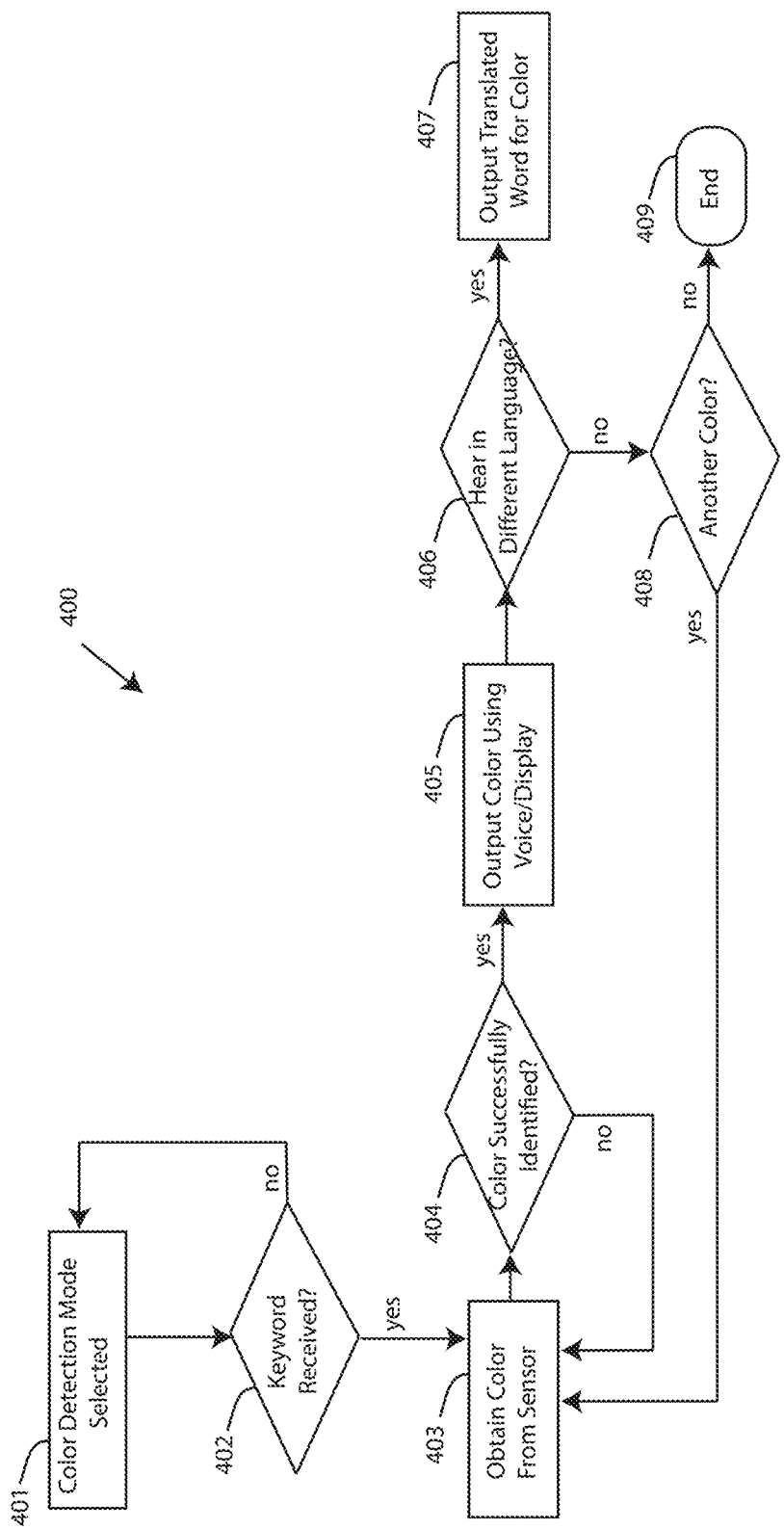
FIG. 10 depicts a detailed flow chart of a color detection mode, in accordance with embodiments of the present invention.

FIG. 10 depicts a detailed flow chart of a color detection mode 400, in accordance with embodiments of the present invention. Step 401 detects that the color detection mode is selected. Step 402 determines whether a keyword (e.g. inquiry about a color of an object) received. If no, then the color detection mode restarts to step 401. If yes, step 403 obtains the color from the color sensor. Step 404 determines whether the color is successfully identified by the color sensor. If no, the color detection mode restarts step 403. If yes, step 405 outputs the color using a voice message and/or display. Step 406 asks whether the user would like to hear the word for the color in another language, or receives an input from the user to pronounce the word in another language. If yes, step 407 outputs the translated word for the color. If no, then step 408 determines whether the user is asking for another color. If yes, the color detection mode restarts at step 403. If no, then step 409 ends the color detection mode.

Figure 11:
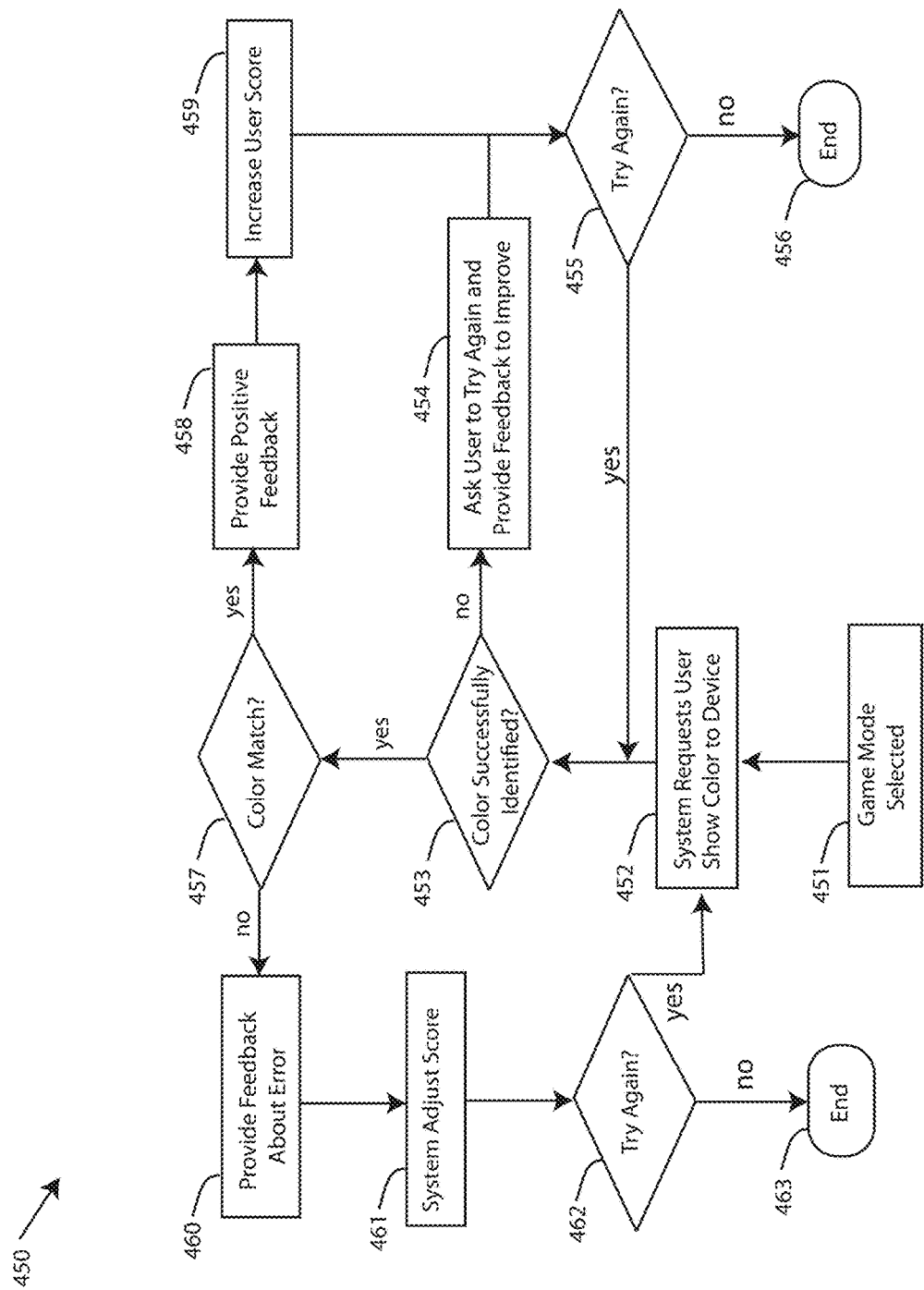
FIG. 11 depicts a detailed flow chart of a game mode, in accordance with embodiments of the present invention.

FIG. 11 depicts a detailed flow chart of a game mode 450, in accordance with embodiments of the present invention. Step 451 determines that the game mode is selected. Step 452 sends a request to the user to show an object of a specific color to the portable computing device. Step 453 determines whether the color is successfully identified by color sensor If no, step 454 asks the user to try again and provides feedback to improve the collection of the data by the color sensor. Step 455 determines whether the user is going to try again. If yes, the game mode restarts at step 453. If no, step 456 ends the game mode. If the color is successfully identified by the color sensor at step 453, then step 457 determines whether the color of the object presented by the user matches the specific color in the request. If yes, then step 458 provides positive feedback, and step 459 increases the user's score. After the score is increases, the game mode proceeds to step 455. If no, then step 460 provides feedback to the user about the error. Step 461 adjusts the score (e.g. decreases the user's score). Step 462 determines whether the user wants to try again. If yes, the game mode proceeds to step 452. If no, step 463 ends the game mode.

Figure 12:
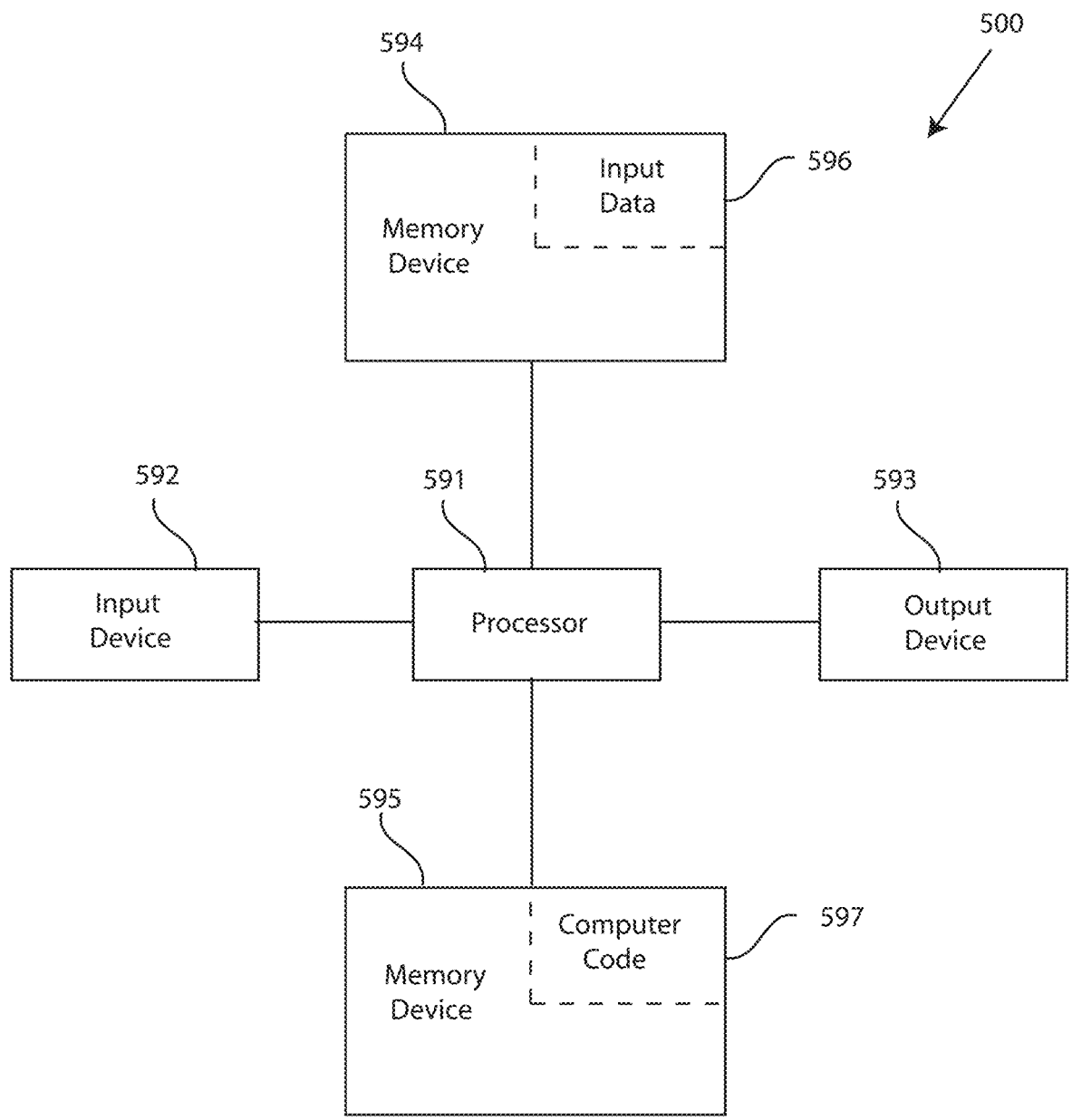
FIG. 12 depicts a block diagram of a computer system for an assisted learning system of FIGS. 1-8, capable of implementing a method for assisted-learning with a portable computing device of FIGS. 9-11, in accordance with embodiments of the present invention.

FIG. 12 depicts a block diagram of a computer system for the assisted learning system 100 of FIGS. 1-8, capable of implementing methods for assisted-learning with a portable computing device of FIGS. 9-11, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for assisted-learning with a portable computing device in the manner prescribed by the embodiments of FIGS. 9-11 using the assisted learning system 100 of FIGS. 1-8, wherein the instructions of the computer code 597 may be executed by processor 591 via memory device 595. The computer code 597 may include software or program instructions that may implement one or more algorithms for implementing the method for assisted-learning with a portable computing device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including, those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN)

or a wide area network (WAN). Further, memory devices 594, 595 may include an operating system (not shown) and may include other systems not shown in FIG. 12.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotte a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to assisted learning with a portable computing device. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to provide assisted-learning with a portable computing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for assisted-learning with a portable computing device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for assisted-learning with a portable computing device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor o carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrates architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
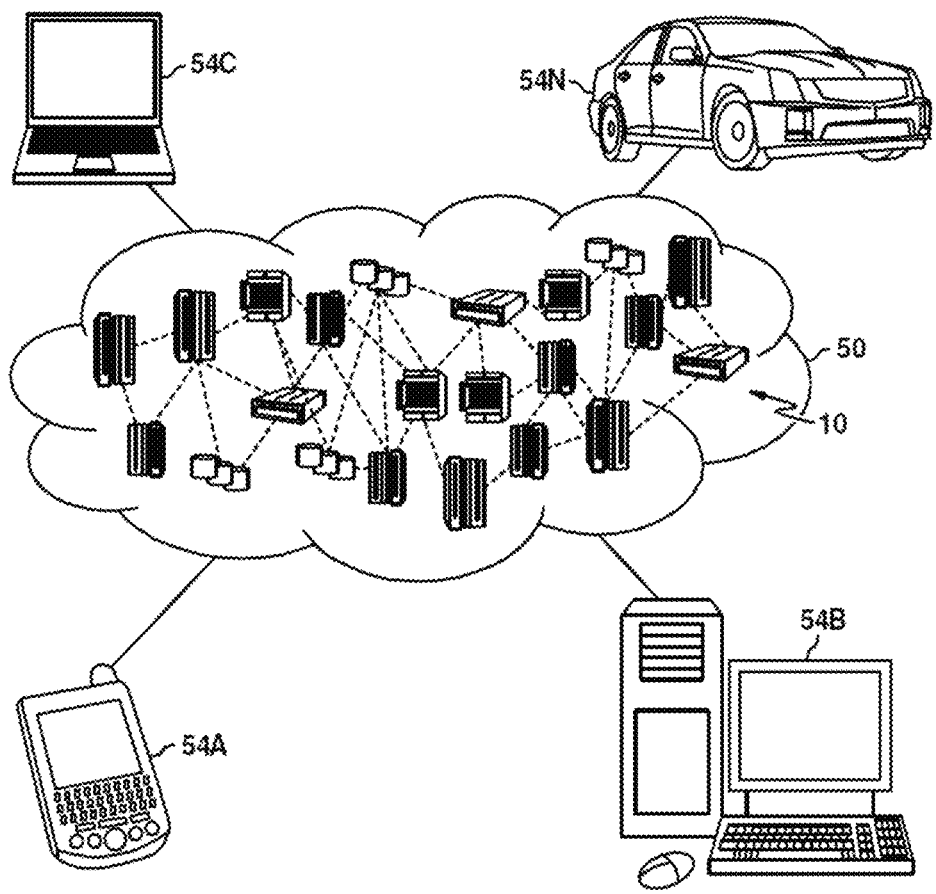
FIG. 13 depicts a cloud computing environment, in accordance with embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 13 are intended to be illustrative only and that computing nodes 10 and cloud computing environment 50 can communicate with any type of computerized device over any type of network and/or network addressable connection (e.g., using a web browser).

Figure 14:
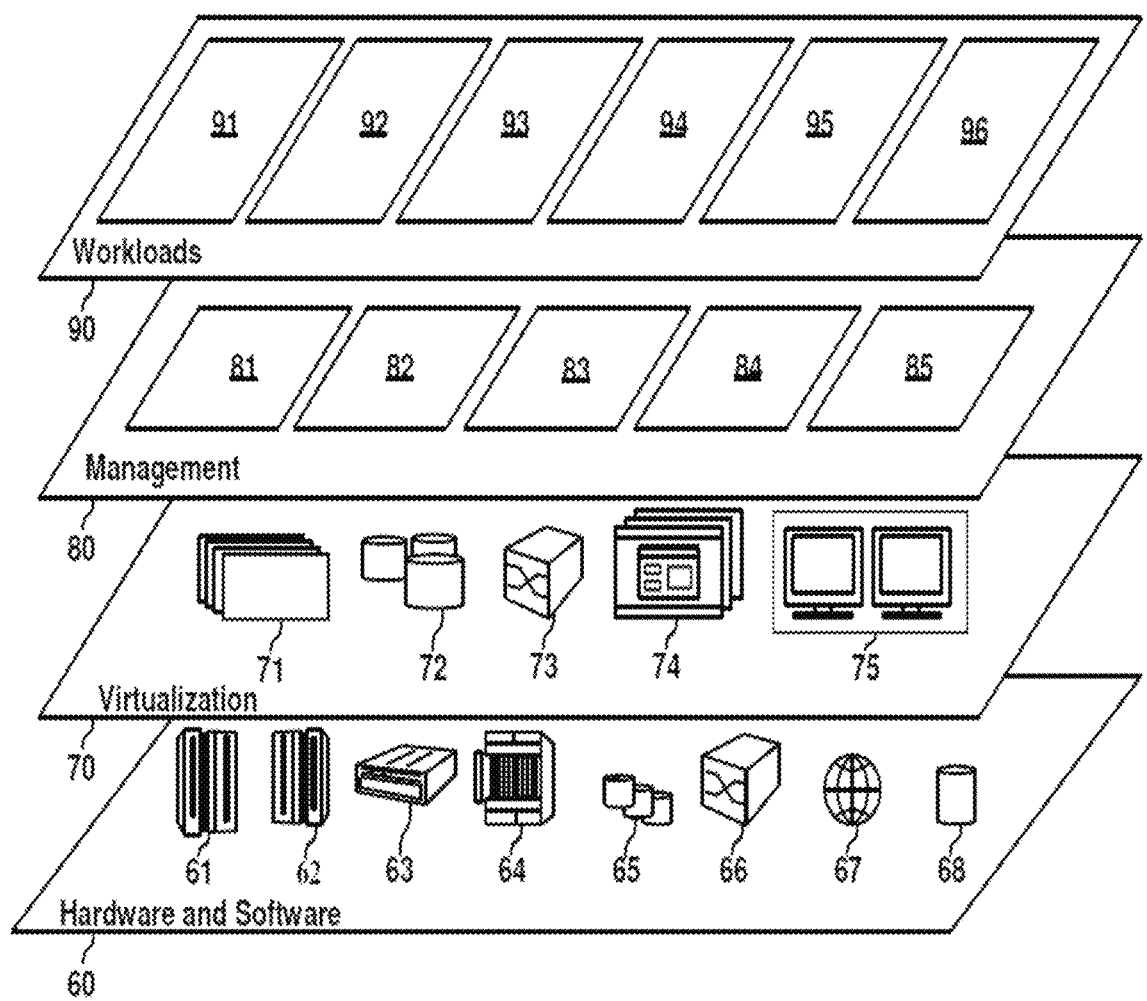
FIG. 14 depicts abstraction model layers, in accordance with embodiments of the present invention.

Referring now to FIG. 14, a set of functional abstraction layers provided by cloud computing environment 50 (see FIG. 13) are shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and instant tongue sampling and diagnosis 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for assisted-learning with a portable computing device, the method comprising:
  in response to detecting that the portable computing device is in a color detection mode:
    converting, by a processor of a computing system, an audio file received from the portable computing device into text;
    parsing, by the processor, the text to determine that a user is requesting an identification of a color of an object in an environment shared by the user;

activating, by the processor, a color sensor of the portable computing device to emit one or more light sources of the color sensor towards the object, the color sensor recording a reflected property of the object, wherein the portable computing device uses the reflected property to obtain a code that is transmitted to the computing system by the portable computing device;

comparing, by the processor, the code with an index of codes each associated with a plurality of colors to determine the color of the object; and determining, by the processor, the color of the object as a result of the comparing; and instructing, by the processor, the portable computing device to audibly output a word associated with the color of the object in the environment in a default language;

in response to detecting that the portable computing device is in a game mode:

requesting, by the processor, that the user identify a specific color;

detecting, by the processor, that the user has placed an article within a field of view of the portable computing device;

activating, by the processor, the color sensor of the portable computing device to emit the one or more light sources of the color sensor towards the article to identify the color of the article;

determining, by the processor, whether a color of the article matches the specific color; and providing, by the processor, at least one of a visual feedback and an audible feedback to the user.

2. The method of claim 1, further comprising, in the color detection mode:

receiving, by the processor, a request that the word associated with the determined color be audibly output in a different language that is different than the default language;

translating, by the processor, the word associated with the determined color into the different language to determine a translated word associated with the determined color; and instructing, by the processor, the portable computing device to audibly output the translated word associated with the determined color of the object in the different language.

3. The method of claim 1, further comprising, in both the color detection mode and the game mode:

detecting, by the processor, that the code is not successfully obtained by the color sensor of the portable computing device;

providing, by the processor, feedback to a user to reposition the portable computing device to improve color identification; and activating, by the processor, the color sensor to emit one or more light sources of the color sensor towards the object.

4. The method of claim 1, wherein, in the game mode, providing visual feedback in the game mode comprises: displaying, by the processor, a congratulatory message on the portable computing device, and initiating, by the processor, a musical sequence.

5. The method of claim 1, further comprising: increasing, by the processor, a score of the user in the game mode, in response to determining that the color of the article matches the specific color.

6. The method of claim 1, further comprising: decreasing, by the processor, a score of the user in the game mode, in response to determining that the color of the article does not match the specific color.

7. The method of claim 6, further comprising: outputting, by the processor, a correct color of the article so that the user understands the error.

8. A computing system, comprising:

a processor;

a memory device coupled to the processor; and a computer readable storage device coupled to the processor, wherein the storage device contains program code executable by the processor via the memory device to implement a method for assisted-learning with a portable computing device, the method comprising:

in response to detecting that the portable computing device is in a color detection mode:

converting, by a processor of a computing system, an audio file received from the portable computing device into text;

parsing, by the processor, the text to determine that a user is requesting an identification of a color of an object in an environment shared by the user;

activating, by the processor, a color sensor of the portable computing device to emit one or more light sources of the color sensor towards the object, the color sensor recording a reflected property of the object, wherein the portable computing device uses the reflected property to obtain a code that is transmitted to the computing system by the portable computing device;

comparing, by the processor, the code with an index of codes each associated with a plurality of colors to determine the color of the object; and determining, by the processor, the color of the object as a result of the comparing; and instructing, by the processor, the portable computing device to audibly output a word associated with the color of the object in the environment in a default language;

in response to detecting that the portable computing device is in a game mode:

requesting, by the processor, that the user identify a specific color;

detecting, by the processor, that the user has placed an article within a field of view of the portable computing device;

activating, by the processor, the color sensor of the portable computing device to emit the one or more light sources of the color sensor towards the article to identify the color of the article;

determining, by the processor, whether a color of the article matches the specific color; and providing, by the processor, at least one of a visual feedback and an audible feedback to the user.

9. The computing system of claim 8, further comprising, in the color detection mode:

receiving, by the processor, a request that the word associated with the determined color be audibly output in a different language that is different than the default language;

translating, by the processor, the word associated with the determined color into the different language to determine a translated word associated with the determined color; and instructing, by the processor, the portable computing device to audibly output the translated word associated with the determined color of the object in the different language.

10. The computing system of claim 8, further comprising, in both the color detection mode and the game mode:
detecting, by the processor, that the code is not successfully obtained by the color sensor of the portable computing device;
providing, by the processor, feedback to a user to reposition the portable computing device to improve color identification; and
activating, by the processor, the color sensor to emit one or more light sources of the color sensor towards the object.

11. The computing system of claim 8, wherein, in the game mode, providing visual feedback in the game mode comprises: displaying, by the processor, a congratulatory message on the portable computing device, and initiating, by the processor, a musical sequence.

12. The computing system of claim 8, further comprising: increasing, by the processor, a score of the user in the game mode, in response to determining that the color of the article matches the specific color.

13. The computing system of claim 8, further comprising: decreasing, by the processor, a score of the user in the game mode, in response to determining that the color of the article does not match the specific color.

14. The computing system of claim 13, further comprising: outputting, by the processor, a correct color of the article so that the user understands the error.

15. A computer program product, comprising a computer readable hardware storage device storing a computer readable program code, the computer readable program code comprising an algorithm that when executed by a computer processor of a computing system implements a method for assisted-learning with a portable computing device, the method comprising:
in response to detecting that the portable computing device is in a color detection mode:
converting, by a processor of a computing system, an audio file received from the portable computing device into text;
parsing, by the processor, the text to determine that a user is requesting an identification of a color of an object in an environment shared by the user;
activating, by the processor, a color sensor of the portable computing device to emit one or more light sources of the color sensor towards the object, the color sensor recording a reflected property of the object, wherein the portable computing device uses the reflected property to obtain a code that is transmitted to the computing system by the portable computing device;
comparing, by the processor, the code with an index of codes each associated. with a plurality of colors to determine the color of the object; and
determining, by the processor, the color of the object as a result of the comparing; and
instructing, by the processor, the portable computing device to audibly output a word associated with the color of the object in the environment in a default language;
in response to detecting that the portable computing device is in a game mode:
requesting, by the processor, that the user identify a specific color;
detecting, by the processor, that the user has placed an article within a field of view of the portable computing device;
activating, by the processor, the color sensor of the portable computing device to emit the one or more light sources of the color sensor towards the article to identify the color of the article;
determining, by the processor, whether a color of the article matches the specific color; and
providing, by the processor, at least one of a visual feedback and an audible feedback to the user.

16. The computer program product of claim 15, further comprising, in the color detection mode:
receiving, by the processor, a request that the word associated with the determined color be audibly output in a different language that is different than the default language;
translating, by the processor, the word associated with the determined color into the different language to determine a translated word associated with the determined color; and
instructing, by the processor, the portable computing device to audibly output the translated word associated with the determined color of the object in the different language.

17. The computer program product of claim 15, further comprising, in both the color detection mode and the game mode:
detecting, by the processor, that the code is not successfully obtained by the color sensor of the portable computing device;
providing, by the processor, feedback to a user to reposition the portable computing device to improve color identification; and
activating, by the processor, the color sensor to emit one or more light sources of the color sensor towards the object.

18. The computer program product of claim 15, wherein, in the game mode, providing visual feedback in the game mode comprises: displaying, by the processor, a congratulatory message on the portable computing device, and initiating, by the processor, a musical sequence.

19. The computer program product of claim 15, further comprising: increasing, by the processor, a score of the user in the game mode, in response to determining that the color of the article matches the specific color.

20. The computer program product of claim 15, further comprising: decreasing, by the processor, a score of the user in the game mode, in response to determining that the color of the article does not match the specific color, and outputting, by the processor, a correct color of the article so that the user understands the error.

* * * * *